(12) United States Patent
Saiga (10) Patent No.: US 8,848,270 B2
(45) Date of Patent: Sep. 30, 2014

(54) IMAGE READING LENS AND IMAGE READING APPARATUS USING IMAGE READING LENS

(75) Inventor: Takeyoshi Saiga, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 163 days.

(21) Appl. No.: 13/108,498

(22) Filed: May 16, 2011

(65) Prior Publication Data

US 2011/0279881 A1 Nov. 17, 2011

(30) Foreign Application Priority Data

May 17, 2010 (JP) ................................ 2010-113171

(51) Int. Cl.
*G02B 13/08* (2006.01)
*H04N 1/10* (2006.01)
*G02B 13/18* (2006.01)
*G02B 27/00* (2006.01)

(52) U.S. Cl.
CPC .............. *G02B 13/08* (2013.01); *H04N 1/1048* (2013.01); *G02B 13/18* (2013.01); *H04N 1/1043* (2013.01); *H04N 1/1056* (2013.01); *H04N 1/1013* (2013.01); *G02B 27/0031* (2013.01); *H04N 1/1017* (2013.01)
USPC ..................................... 359/207.5; 359/207.3

(58) Field of Classification Search
USPC .............. 359/668, 206.1–207.1, 207.2–207.5
See application file for complete search history.

(56) References Cited

U.S. PATENT DOCUMENTS

| 6,181,482 | B1 * | 1/2001 | Grafton | ......................... 359/670 |
| 6,937,371 | B2 * | 8/2005 | Hayashi et al. | .......... 359/207.11 |
| 7,068,407 | B2 * | 6/2006 | Sakai et al. | ................. 359/204.1 |
| 7,256,917 | B2 | 8/2007 | Ishihara | |
| 7,397,620 | B2 * | 7/2008 | Hayashide et al. | ........... 359/668 |
| 2003/0002170 | A1 * | 1/2003 | Hayashide | .................... 359/668 |

FOREIGN PATENT DOCUMENTS

| JP | 2000289056 A | 10/2000 |
| JP | 2000307800 A | 11/2000 |
| JP | 2005157111 A | 6/2005 |
| JP | 2008065234 A | 3/2008 |

OTHER PUBLICATIONS

Japanese Office Action cited in Japanese counterpart application No. JP2010-113171, dated May 13, 2014.

* cited by examiner

*Primary Examiner* — Zachary Wilkes
(74) *Attorney, Agent, or Firm* — Rossi, Kimms & McDowell LLP (57) ABSTRACT

Provided is an image reading lens to be used for reading image information of an original. The image reading lens includes an anamorphic lens having at least one anamorphic surface with an aspherical shape which is rotationally asymmetric about an optical axis. The anamorphic lens has a non-arc shape in each of a main scanning section and a sub scanning section. The at least one anamorphic surface has a positive optical power in a main scanning direction on the optical axis, and a non-arc amount of the sub scanning section continuously changes with an increase in distance from the optical axis in the main scanning direction.

8 Claims, 5 Drawing Sheets

IMAGE READING LENS AND IMAGE READING APPARATUS USING IMAGE READING LENS

BACKGROUND OF THE INVENTION

1. Field of the Invention

The present invention relates to an image reading lens for reading an original placed on an original table and an image reading apparatus using the image reading lens. In particular, the present invention is suitable for image reading apparatus such as an image scanner, a copying machine, and a facsimile machine, which are capable of high-precision image reading by fully utilizing the optical performance of an image reading lens having an anamorphic lens.

2. Description of the Related Art

Up to now, as apparatus for reading image information of an original placed on an original table, image reading apparatus such as an image scanner and a digital copying machine are known. Of the image reading apparatus, there is known a flatbed type image scanner using an integrated scanning optical unit (carriage-integrated unit) in which an imaging optical system for image reading and a reading unit are contained in a case (carriage).

In this image reading apparatus, the original placed on the original table is illuminated directly or through a reflection shade with a light beam emitted from an illumination light source. An optical path of the light beam reflected on the original is bent in an inner portion of the carriage through multiple reflection mirrors. The image information of the original is imaged by the imaging optical system on a surface of a linear image sensor (hereinafter referred to as "CCD sensor" or "CMOS sensor") in which reading pixels are arranged in a main scanning direction. The carriage is moved in a sub scanning direction by a sub scanning motor to read the image information of the original. The read image information is sent to an external device, for example, a personal computer through an interface.

In recent years, the image reading apparatus having the structure described above is desired to be reduced in size. In order to achieve the reduction in size, it is important to reduce the size of the carriage. In order to reduce the size of the carriage, for example, there are a method of increasing the number of reflection mirrors and a method of performing multiple reflections using a single reflection mirror to ensure an optical path length. In addition to this, in recent years, there is proposed an image reading apparatus in which an anamorphic lens having at least one surface with a rotationally asymmetric shape about an optical axis is introduced into the imaging optical system (image reading lens). In the case of the image reading apparatus, a view angle of the imaging optical system (imaging system) is widened to reduce an object-to-image distance, to thereby shorten the optical path length and reduce the overall size of the apparatus.

When the anamorphic lens is used for the imaging optical system as described above, an image field curvature aberration may be effectively reduced, and hence image information with an excellent contrast may be obtained. However, when the anamorphic lens is used, an imaging magnification, particularly, an imaging magnification in the sub scanning direction (sub-scanning magnification) may be changed from the optical axis to a peripheral region. Therefore, when an image is to be read by a three-line color sensors of R, G, and B of a color image reading apparatus, an imaging position is shifted for each of the colors, and color drift may occur in the sub scanning direction.

In contrast to this, there is proposed a color image reading apparatus in which the specifications (shapes) of a line sensor and a distortion component of an image reading lens in a sub scanning direction are suitably set to obtain an excellent color image (see Japanese Patent Application Laid-Open No. 2000-307800). Further, there is proposed a color image reading apparatus in which a shape of a lens having two anamorphic surfaces is suitably set to obtain an excellent color image (see Japanese Patent Application Laid-Open No. 2008-065234).

In recent years, there is a strong demand for the image reading apparatus to read image information with high contrast and high precision during the reading of image information. In order to read the image information with high precision in the image reading apparatus, it is important to reduce sagittal flare and an image field curvature in the main scanning direction. If the sagittal flare and the image field curvature are not suitably corrected, it is difficult to excellently read the image information with high contrast over the entire region in the main scanning direction.

SUMMARY OF THE INVENTION

It is an object of the present invention to provide an image reading lens in which sagittal flare and an image field curvature aberration in a main scanning direction may be reduced to read image information with high precision, and also provide an image reading apparatus using the image reading lens.

In order to address the above-mentioned problems, according to the present invention, there is provided an image reading lens to be used for an image reading apparatus for reading image information of an original by imaging the image information of the original on a reading unit including multiple reading pixels arranged in a main scanning direction and by relatively moving the original and the reading unit in a sub scanning direction, the image reading lens including an anamorphic lens having at least one anamorphic surface with an aspherical shape which is rotationally asymmetric about an optical axis, in which; the anamorphic surface has a non-arc shape in each of a main scanning section and a sub scanning section; and the anamorphic lens has a positive optical power in the main scanning direction on the optical axis, and a non-arc amount of the sub scanning section of the anamorphic surface continuously changes with an increase in distance from the optical axis in the main scanning direction.

In the above-mentioned image reading lens, in the at least one anamorphic surface, the main scanning section and the sub scanning section can have the same shape in an on-axis light beam diameter range relative to the optical axis.

Further, in the above-mentioned image reading lens, the following condition can be satisfied:

$$0.5 \leq S/d \leq 3.0$$

where d (mm) indicates a thickness of the anamorphic lens and S (mm) indicates an on-axis effective length of a light incident surface in the sub scanning direction.

Alternatively, in the above-mentioned reading lens, the anamorphic lens can include a light incident surface and a light exiting surface each having an anamorphic shape which is rotationally asymmetric about the optical axis.

Alternatively, in the above-mentioned image reading lens, the anamorphic lens can be molded by resin.

Further, in the above-mentioned image reading lens, the image reading lens can include, in order from a surface of the original: a first lens of a positive lens having a meniscus shape with a convex surface facing the surface of the original; a second lens of a negative biconcave lens; a third lens of a positive biconvex lens; and a fourth lens which has a meniscus shape with a convex surface facing toward the reading unit and includes an anamorphic surface.

Further, in the above-mentioned image reading lens, the following condition can be satisfied over an entire region in the main scanning direction:

$$-15 < S4_n/S4_0 < 15$$

where $S4_n$ indicates a fourth-order coefficient related to a sagittal line of the anamorphic surface at an arbitrary position in the main scanning direction, and $S4_0$ indicates a fourth-order coefficient related to an on-axis sagittal line of the anamorphic surface.

According to another aspect of the present invention, the present invention encompasses an image reading apparatus including the above-mentioned image reading lens.

The present invention can provide the image reading lens in which sagittal flare and an image field curvature aberration in the main scanning direction may be reduced to read image information with high precision.

Further features of the present invention will become apparent from the following description of exemplary embodiments with reference to the attached drawings.

DESCRIPTION OF THE EMBODIMENTS

Hereinafter, embodiments of the present invention are described with reference to the attached drawings. According to an image reading lens in the present invention, image information of an original is imaged on a reading unit including multiple reading pixels arranged in a main scanning direction (one-dimensional direction). The image reading lens is used for an image reading apparatus in which the original and the reading unit are relatively moved in a sub scanning direction orthogonal to the main scanning direction to two-dimensionally read the image information of the original.

Figure 1:
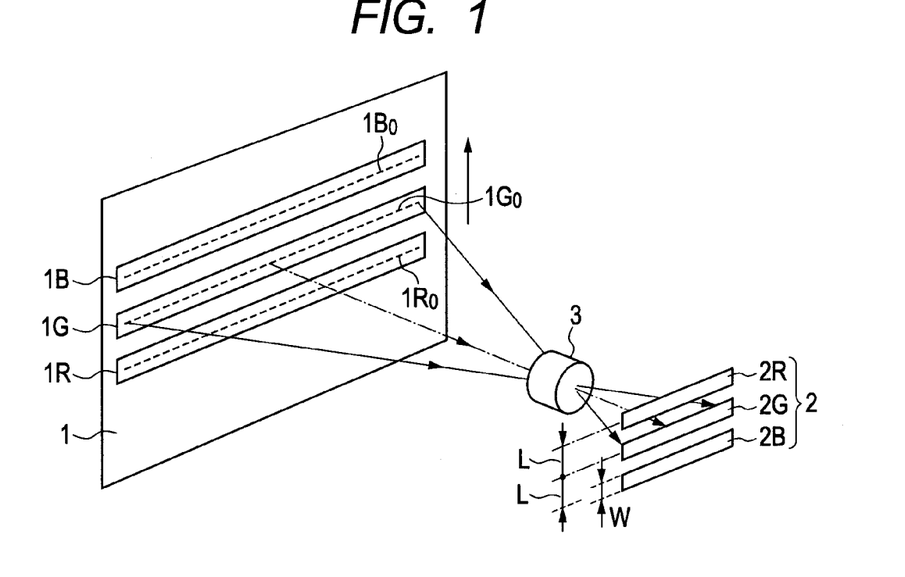
FIG. 1 is a main part schematic view illustrating a fundamental structure of an optical system of an image reading apparatus according to the present invention.

FIG. 1 is a main part schematic view illustrating a fundamental structure of an imaging optical system used for an image reading apparatus according to the present invention. In FIG. 1, a color image (image information) is formed on an original 1. Reading areas 1R, 1G, and 1B for reading the image information are located on the original 1. The image information is imaged to a reading unit 2 including three line sensors (CCD sensors or CMOS sensors) 2R, 2G, and 2B described later. The reading areas are in conjugate with a surface of the reading unit 2. In this case, an arrangement direction of reading pixels of the reading unit 2, that is, a longitudinal direction of the reading areas 1R, 1G, and 1B is set as the main scanning direction. An image reading lens (imaging optical system) 3 includes an anamorphic lens having at least one surface with a rotationally asymmetric shape about an optical axis, and serves to image a light beam based on the image information of the original 1 on the surface of the reading unit 2.

The reading unit (line sensor) 2 includes a monolithic three-line sensor in which the three line sensors 2R, 2G, and 2B are arranged in parallel to one another on the same surface of a substrate. The reading unit 2 includes the multiple reading pixels arranged in the main scanning direction. Color filters (not shown) for light beams of respective colors (for example, red (R), green (G), and blue (B)) are provided above surfaces of the three line sensors 2R, 2G, and 2B. The line sensors 2R, 2G, and 2B each have a width W in a short-side direction (sub scanning direction orthogonal to main scanning direction) and are arranged at line intervals L. When the original 1 is scanned (moved) in the sub scanning direction, image information of the respective colors on the reading areas 1R, 1G, and 1B of the original 1 are sequentially read by linear sequential processing by the three line sensors 2R, 2G, and 2B.

Figure 2:
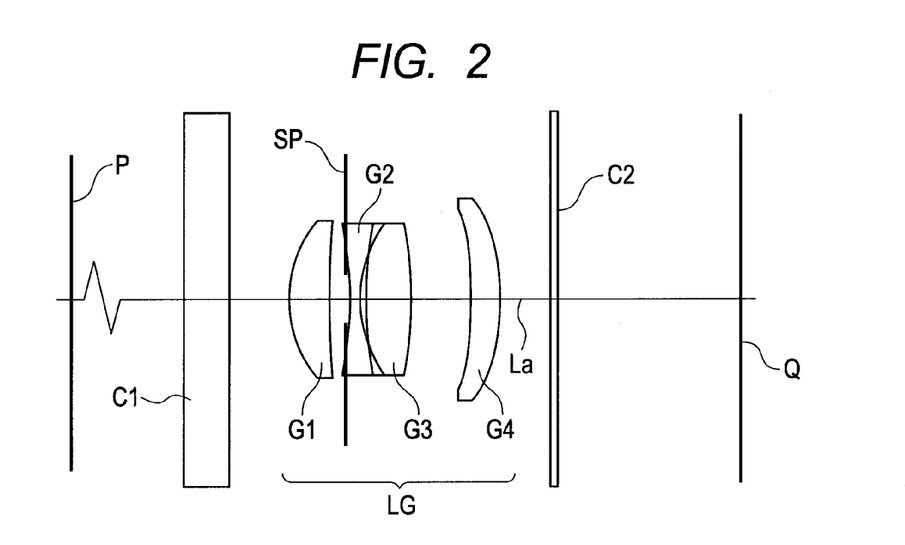
FIG. 2 is a lens section in Numerical Embodiment 1 of the present invention.
Figure 3:
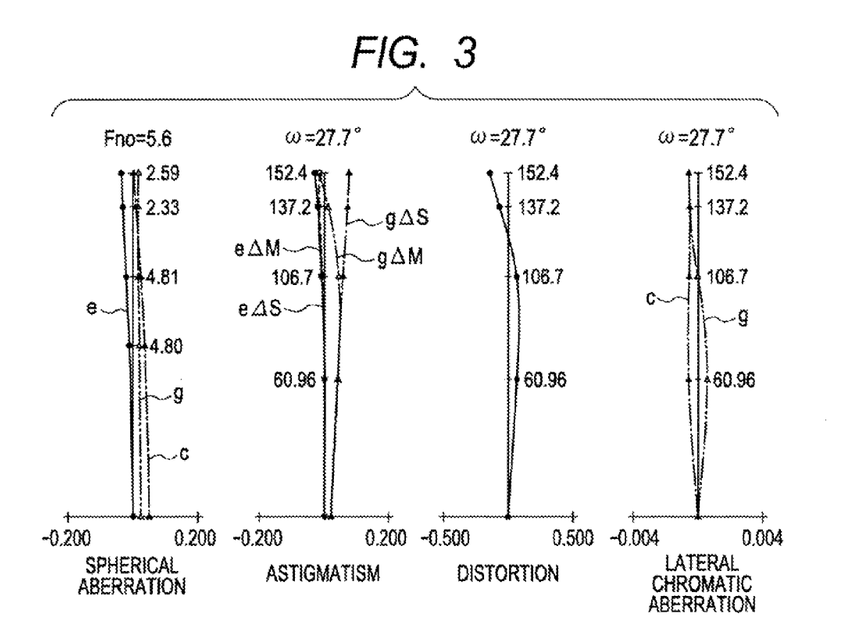
FIG. 3 is a diagram illustrating various aberrations in Numerical Embodiment 1 of the present invention.
Figure 4:
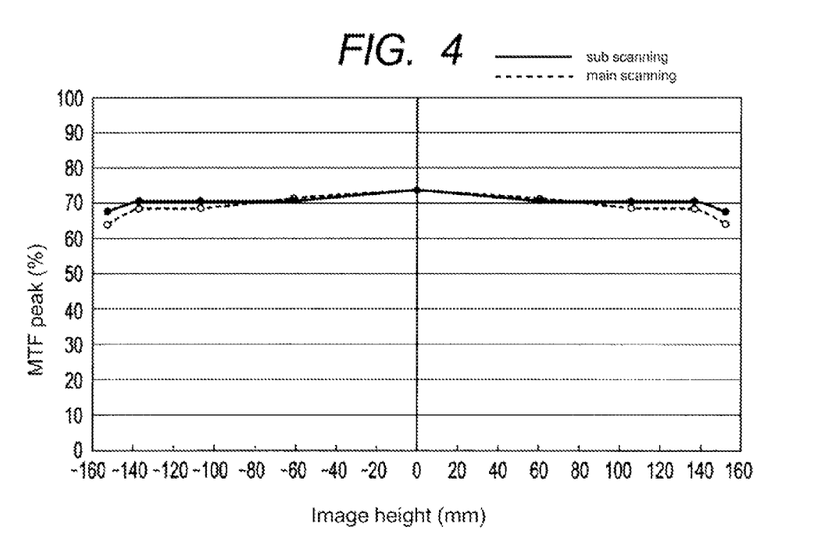
FIG. 4 is a graph illustrating a color drift amount caused by a sub-scanning magnification in Numerical Embodiment 1 of the present invention.
Figure 5:
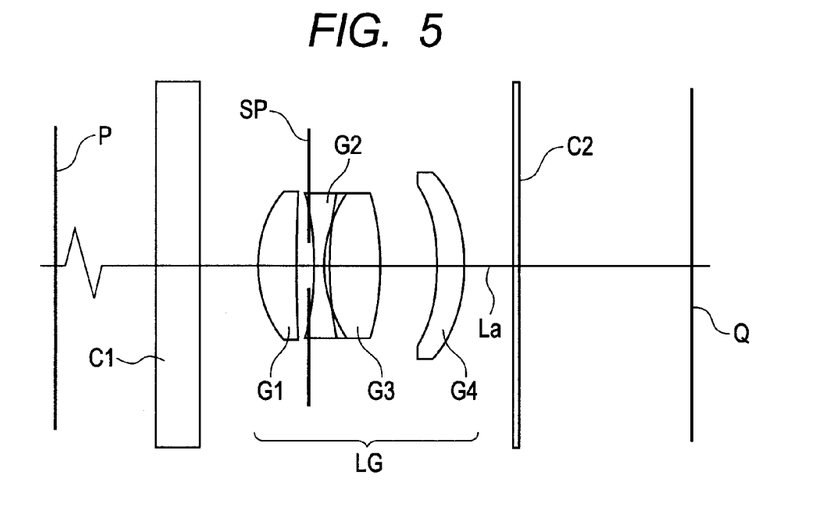
FIG. 5 is a lens section in Numerical Embodiment 2 of the present invention.
Figure 6:
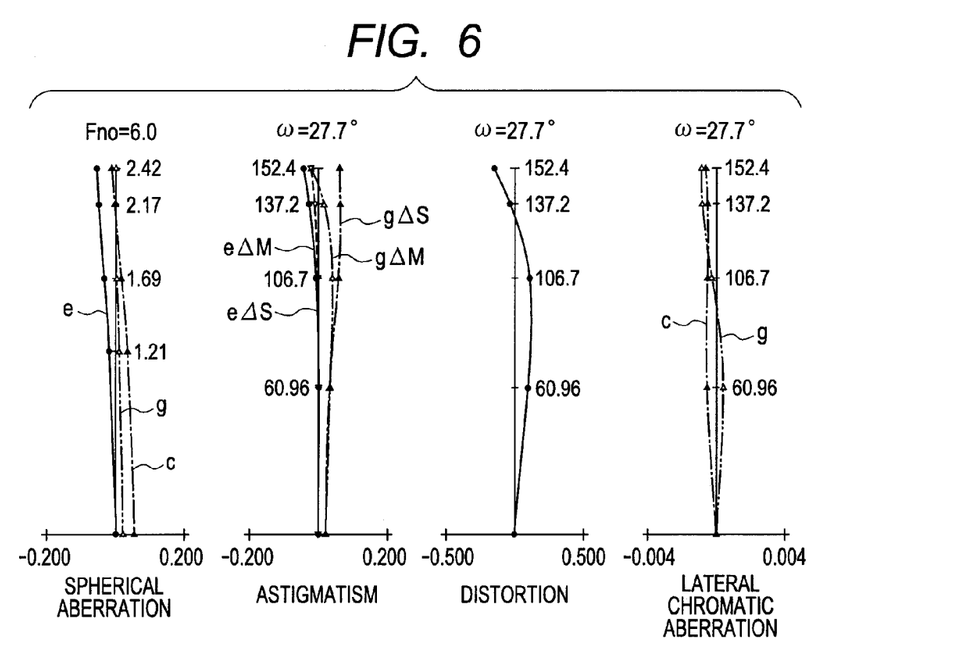
FIG. 6 is a diagram illustrating various aberrations in Numerical Embodiment 2 of the present invention.
Figure 7:
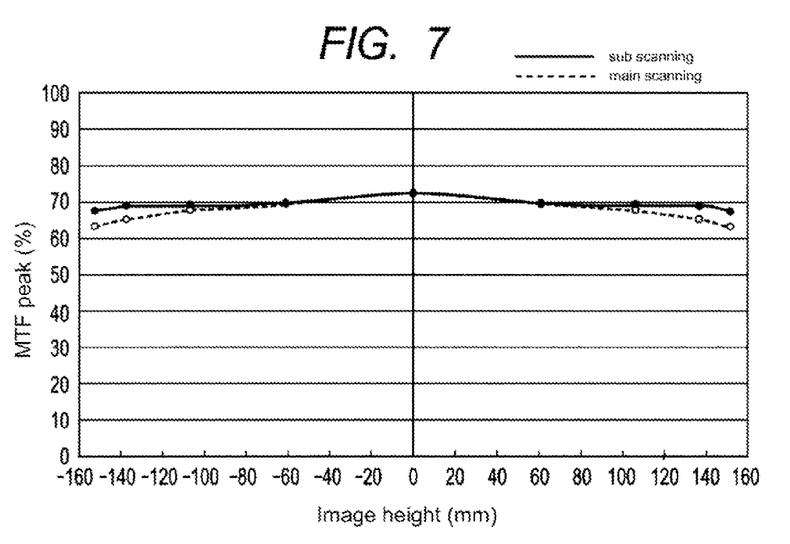
FIG. 7 is a graph illustrating a color drift amount caused by a sub-scanning magnification in Numerical Embodiment 2 of the present invention.

FIGS. 2, 3, and 4 are a lens sectional view illustrating the image reading lens 3 according to Numerical Embodiment 1 of the present invention as described later, a diagram illustrating various aberrations (spherical aberration, astigmatism, distortion, and lateral chromatic aberration), and an MTF distribution graph in a best focus position on the entire main scanning region, respectively. FIGS. 5, 6, and 7 are a lens sectional view illustrating the image reading lens 3 according to Numerical Embodiment 2 of the present invention as described later, a diagram illustrating various aberrations (spherical aberration, astigmatism, distortion, and lateral chromatic aberration), and an MTF distribution graph in a best focus position on the entire main scanning region, respectively.

In the lens sectional views of FIGS. 2 and 5, an original surface P and an image plane Q are set. An original table glass C1, an image reading lens (imaging optical system) LG, and a cover glass C2 are provided. An i-th lens Gi is counted from the original 1 side. A stop SP is provided. An optical axis La is set. In the aberration diagrams of FIGS. 3 and 6, "e", "g", and "c" indicate an e-line, a g-line, and a c-line, respectively. In addition, eΔM and gΔM indicate a meridional image plane for the e-line and a meridional image plane for the g-line, respectively. In addition, eΔS and gΔS indicate a sagittal image plane for the e-line and a sagittal image plane for the g-line, respectively. Lateral chromatic aberrations relate to the g-line and the c-line. In addition, Fno indicates an F-number and ω indicates a half view angle. In the respective embodiments, the image reading lens LG includes an anamorphic lens having at least one anamorphic surface with an aspherical shape rotationally asymmetric about the optical axis La.

The anamorphic lens includes a main scanning section and a sub scanning section which are formed into a non-arc shape. The at least one anamorphic surface has a positive optical power in the main scanning direction on the optical axis (paraxial ray) La. A non-arc amount of the sub scanning section of the anamorphic surface continuously changes as a distance from the optical axis LA increases in the main scanning direction.

As illustrated in FIGS. 2 and 5, the image reading lens LG has the following specific lens structures provided in order from the original surface P side to the image plane Q side. That is, the image reading lens LG includes a first lens (positive lens) G1 of a positive optical power having a meniscus shape with a convex surface facing the original surface P side, the stop SP, a second lens (negative lens) G2 with biconcave lens surfaces, and a third lens (positive lens) G3 with biconvex lens surfaces. The image reading lens LG further includes a fourth lens (anamorphic lens) G4 having a meniscus shape with a convex surface facing the image plane Q side (reading unit side). The anamorphic lens G4 includes a light incident surface R8 and a light exiting surface R9 which each have an anamorphic shape, and is made of resin.

Figure 8:
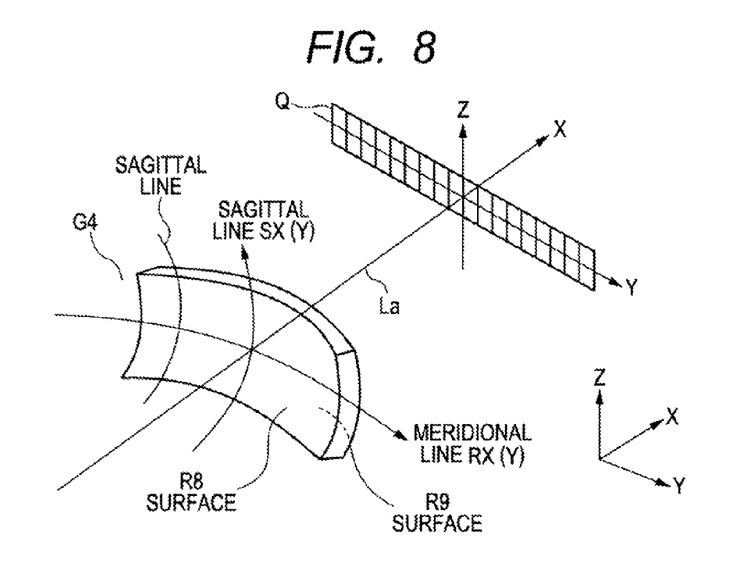
FIG. 8 is a main part perspective view illustrating a relationship between an anamorphic lens and an image plane.

FIG. 8 is a main part perspective view illustrating a relationship between the anamorphic lens G4 which is a component of the image reading lens according to the present invention and the image plane Q. In FIG. 8, the optical axis La (X-Direction) is determined by the first lens G1 to the third lens G3 which have rotationally symmetric surfaces in FIGS. 2 and 5. The anamorphic lens G4 has, as a meridional line, a section shape in the main scanning section (XY section) including the arrangement direction (main scanning direction) (Y-direction) of the pixels of the reading unit 2.

In the respective embodiments, on the optical axis La (Y=Z=0), a curvature RX(Y) of a meridional line in the main scanning section of each of the anamorphic surfaces (light incident surface and light exiting surface) R8 and R9 is equal to a curvature SX(Y) of a sagittal line in the sub scanning section (XZ-section) including the optical axis La in the perpendicular direction (sub scanning direction, Z-direction, sagittal direction) to the main scanning section. The main scanning section and the sub scanning section have the same shape in an on-axis light beam diameter range relative to the optical axis La. The curvature (curvature of sagittal line) SX(Y) in the perpendicular direction to the main scanning section continuously changes as a distance from the optical axis La increases in the meridional direction (Y-direction). The non-arc amount of the sub scanning section continuously changes as the distance from the optical axis La increases in the main scanning direction. The anamorphic surfaces have a positive optical power in the main scanning direction on the optical axis.

Embodiment 1

Next, an image reading lens according to Numerical Embodiment 1 corresponding to Embodiment 1 of the present invention is described. In Numerical Embodiment 1, "f" indicates a focal length of the image reading lens LG, Fno indicates the F-number, β indicates a magnification, Y indicates a maximum object height, and ω indicates the half view angle. In the image reading lens LG, "i" indicates a surface number counted from the original surface P side. In addition, Ri indicates a curvature radius of each surface, Di indicates a member thickness or air interval between an i-th surface and an (i+1)-th surface, and Nd1 and vdi indicate a refractive index of a material with respect to the d-line and an Abbe number of the material with respect to the d-line, respectively.

In Numerical Embodiment 1 corresponding to Embodiment 1, the shapes of the anamorphic surfaces are expressed by, for example, expressions defined as below. Coefficients of the anamorphic surfaces are also indicated below.

With respect to a shape of an aspherical surface having an optical power rotationally asymmetric about the optical axis, assume that an intersection between a lens surface and the optical axis is an origin, the optical axis direction is the x-axis, an axis orthogonal to the optical axis in the main scanning section is the y-axis, and an axis orthogonal to the optical axis in the sub scanning direction is the z-axis. In this case, a meridional shape X is expressed by the following expression.

$$X = \frac{\frac{y^2}{R}}{1 + \sqrt{1 - (1+k_y)\left(\frac{y}{R}\right)^2}} + B_4 y^4 + B_6 y^6 + B_8 y^8 + B_{10} y^{10}$$

where R indicates a curvature radius and $k_y$, $B_4$, $B_6$, $B_8$, and $B_{10}$ indicate aspherical coefficients. When a plane perpendicular to the meridional line on the meridional line is assumed as a section, a sagittal shape S is expressed by the following expression.

$$S = \frac{\frac{z^2}{r'}}{1 + \sqrt{1 - (1+K_z)\left(\frac{z}{r'}\right)^2}} + \sum D_i Z^i + \sum\sum M_{j\_k} Y^j Z^k$$

$i: 2 \cdot 4 \cdot 6 \cdot 8 \cdot 10 \ldots$ $j: 2 \cdot 4 \cdot 6 \cdot 8 \cdot 10 \ldots$ $k: 2 \cdot 4 \cdot 6 \cdot 8 \ldots$ $1/r' = 1/r_0 + E_2 Y^2 + E_4 Y^4 + E_6 Y^6 + E_8 Y^8 + E_{10} Y^{10}$ where $r_0$ indicates a curvature radius of the sagittal line on the optical axis, and $R=r_0$. In addition, $D_i$, $M_{j\_k}$, $E_2$, $E_4$, $E_6$, $E_8$, and $E_{10}$ indicate aspherical coefficients. Therefore, in Numerical Embodiment 1 corresponding to Embodiment 1, the curvature of the sagittal line is a curvature defined in a plane including a normal to an anamorphic surface which is perpendicular to the main scanning section and located at a position in any meridional direction. In other words, the curvature SX(Y) of the sagittal line is a curvature defined in a plane including a line perpendicular to a tangent to a meridional shape which is perpendicular to the main scanning section and located at a position in any meridional direction. The curvature RX(Y) of the meridional line is a curvature at a position Y in any meridional direction in the main scanning section.

Numerical Embodiment 1

TABLE 1

| | Surface | R | D | Nd | vd |
|---|---|---|---|---|---|
| C1 | | ∞ | 3.9 | 1.516 | 64.1 |
| | | ∞ | | | |
| G1 | 1 | 10.343 | 3.37 | 1.603 | 60.6 |
| | 2 | 114.839 | 1.31 | | |
| SP | 3 | ∞ | 0.38 | | |
| G2 | 4 | −29.751 | 0.82 | 1.640 | 34.5 |
| | 5 | 10.686 | 0.51 | | |
| G3 | 6 | 32.427 | 3.81 | 1.772 | 49.6 |
| | 7 | −32.427 | 5.06 | | |
| G4 | 8* | −58.083 | 2.57 | 1.53 | 55.8 |
| | 9* | −23.784 | | | |
| C2 | | ∞ | 0.55 | 1.516 | 64.1 |
| | | ∞ | | | |

| | |
|---|---|
| f | 29.0 mm |
| Fno | 5.6 |
| β | 0.11 |
| Y | 152 mm |
| ω | 27.7° |

TABLE 1-continued

|  | Eighth surface | Ninth surface |
|---|---|---|
| R | −5.81En+01 | −2.38E+01 |
| ky | −1.30E+01 | 1.40E+00 |
| $B_4$ | −1.28E−04 | −7.69E−05 |
| $B_6$ | −7.15E−07 | −7.52E−07 |
| $B_8$ | −1.51E−08 | −1.07E−08 |
| $B_{10}$ | 2.95E−10 | 7.07E−11 |
| r | −5.81E+01 | −2.38E+01 |
| $K_Z$ | −1.30E+01 | 1.40E+00 |
| $D_4$ | −1.28E−04 | −7.69E−05 |
| $D_6$ | −7.15E−07 | −7.52E−07 |
| $D_8$ | −1.51E−08 | −1.07E−08 |
| $D_{10}$ | 2.95E−10 | 7.07E−11 |
| $E_2$ | 1.72E−04 | 3.49E−04 |
| $E_4$ | 3.26E−06 | −5.35E−06 |
| $E_6$ | −2.66E−07 | 1.33E−07 |
| $E_8$ | −3.81E−09 | −7.66E−09 |
| $E_{10}$ | 1.42E−10 | 8.86E−11 |
| $M_{24}$ | 3.94E−05 | 2.98E−05 |
| $M_{44}$ | −4.44E−06 | −2.60E−06 |
| $M_{64}$ | 1.25E−07 | 4.89E−08 |
| $M_{84}$ | −1.04E−09 | −2.35E−10 |

Next, coefficients $M_{2\_4}$, $M_{4\_4}$, $M_{6\_4}$, and $M_{8\_4}$ of both the surfaces R8 and R9 of the anamorphic lens of the image reading lens LG according to Embodiment 1 are values described above. Therefore, the non-arc amount defined up to the fourth order in the sub scanning section at the position in the main scanning direction continuously changes depending on the main scanning position. When a main scanning change in non-arc amount is provided for both surfaces, a sagittal flare is more excellently corrected.

In Embodiment 1, the coefficients described above are used, but any aspherical coefficients of the definition expressions described above may be used. The non-arc amount change may be provided for not both surfaces but only one of the surfaces. In this embodiment, the main scanning section and the sub scanning section have the same shape in a range of an on-axis light beam diameter of ϕ3.5 mm relative to the optical axis. Therefore, by forming the main scanning section and the sub scanning section into the same shape in the on-axis light beam diameter range, the on-axis optical performance is excellently corrected. In this embodiment, completely the same shape is provided, but the present invention is not limited thereto. A shape difference between the main scanning section and the sub scanning section in the on-axis light beam diameter range may be in a range of ±2 µm.

The curvature of the sub scanning section in the direction perpendicular to the main scanning section continuously changes as the distance from the optical axis La in the meridional direction (y-direction) increases, and hence an image field curvature is excellently corrected. The non-arc amount of the sub scanning section also continuously changes as the distance from the optical axis in the main scanning direction increases, and hence the sagittal flare is excellently corrected at the arbitrary position in the main scanning direction. Therefore, as illustrated in FIG. 4, the image reading lens having a substantially uniform and high contrast in the entire original reading width range is realized. As illustrated in FIG. 3, the image field curvature for the e-line is excellently corrected. Thus, in this embodiment, the image field curvature and the sagittal flare are excellently corrected at the arbitrary position in the main scanning direction. Assume that $S4_n$ indicates a fourth-order coefficient related to a sagittal line at the arbitrary position in the main scanning direction and $S4_0$ indicates a fourth-order coefficient related to an on-axis sagittal line. In this case, the following expression is satisfied in the entire main scanning direction region.

$$-15 < S4_n/S4_0 < 15 \quad (1)$$

In this embodiment, the eighth surface is as follows.

$$S4_n = -3.89E\text{-}04 \text{ to } -3.36E\text{-}05$$

$$S4_0 = -1.28E\text{-}04$$

$$S4_n/S4_0 = 0.26 \text{ to } 3.04$$

The 9th surface is as follows.

$$S4_n = -4.89E\text{-}04 \text{ to } -1.46E\text{-}05$$

$$S4_0 = -7.69E\text{-}05$$

$$S4_n/S4_0 = -0.19 \text{ to } 6.36$$

In this embodiment, the anamorphic lens G4 is molded by resin. Because a lens diameter of the anamorphic lens G4 is apt to increase more among the constituent lenses, the resin is used to realize a lower cost. Assume that d indicates a thickness of the anamorphic lens G4 and S indicates an effective length of the light incident surface in the sub scanning direction. In this case, the following condition is desirably satisfied.

$$0.5 \leq S/d \leq 3.0 \quad (2)$$

In this embodiment,
S=ϕ3.5 mm
d=2.57 mm
S/d=1.36.

When S/d is smaller than a lower limit of Conditional Expression (2), a ratio of the thickness of the anamorphic lens to the light beam diameter increases and a fluctuation in molding shot becomes larger. This is not desirable. When S/d exceeds an upper limit of Conditional Expression (2), the ratio of the thickness of the anamorphic lens is too small, and hence an optical element strength is insufficient and a deformation occurs during holding. This is not desirable. When Conditional Expression (2) is satisfied, the anamorphic lens having a balance between moldability and strength is easily realized.

The power (optical power) of the anamorphic lens in the main scanning direction is made positive, and hence a focus shift due to a change in refractive index of glass which is the material of the first, second, and third lenses and a change in refractive index of the material of the anamorphic lens G4 during an increase in temperature is cancelled. Therefore, stable imaging performance is achieved.

As described above, according to this embodiment, the image reading lens may be obtained in which the excellent correction of the sagittal flare and the reduction in image field curvature aberration are achieved over the entire main scanning direction region in the original surface.

Embodiment 2

Next, an image reading lens according to Embodiment 2 of the present invention is described. Embodiment 2 is different from Embodiment 1 in the point of the definition of the anamorphic surface. In Embodiment 2, the anamorphic surface is defined as follows. With respect to a shape of an aspherical surface having an optical power rotationally asymmetric about the optical axis, assume that an intersection between a lens surface and the optical axis is an origin. Assume that the optical axis direction is the x-axis, the axis orthogonal to the optical axis in the main scanning section is the y-axis, and the axis orthogonal to the optical axis in the sub scanning section is the z-axis. In this case, an anamorphic surface shape X is a shape expressed by the following power series of Y and Z.

$$X = \Sigma C_{i\_j} Y^i Z^j$$

The anamorphic surface is defined by the power series with respect to the optical axis as described above, and hence a result obtained by evaluating the shape of the optical element is speedily and easily fed back. Numerical values in Numerical Embodiment 2 corresponding to Embodiment 2 are shown as in the case of Numerical Embodiment 1.

long as the shape difference between the main scanning section and the sub scanning section is in the range of ±2 μm. More preferably, the main scanning section and the sub scanning section in the range of the on-axis light beam diameter relative to the optical axis have the same shape as long as the shape difference between the main scanning section and the sub scanning section is in a range of ±1 μm. Therefore, on-axis performance is more excellently corrected.

The curvature in the direction perpendicular to the main scanning section continuously changes as the distance from the optical axis La in the meridional direction (y-direction) increases, and hence an image field curvature is excellently

TABLE 2

| | Surface | R | D | Nd | νd |
|---|---|---|---|---|---|
| C1 | | ∞ | 3.9 | 1.516 | 64.1 |
| | | ∞ | | | |
| G1 | 1 | 9.944 | 3.35 | 1.603 | 60.6 |
| | 2 | 83.396 | 1.13 | | |
| SP | 3 | ∞ | 0.42 | | |
| G2 | 4 | −25.733 | 0.81 | 1.640 | 34.5 |
| | 5 | 10.432 | 0.53 | | |
| G3 | 6 | 33.208 | 4.38 | 1.772 | 49.6 |
| | 7 | −20.734 | 4.93 | | |
| G4 | 8* | — | 2.3 | 1.53 | 55.8 |
| | 9* | — | | | |
| C2 | | ∞ | 0.55 | 1.516 | 64.1 |
| | | ∞ | | | |

| f | 29.0 mm |
|---|---|
| Fno | 6 |
| β | 0.11 |
| Y | 152 mm |
| ω | 27.7° |

| $C_{ij}$ | | | j | | | |
|---|---|---|---|---|---|---|
| | 10 | 8 | 6 | 4 | 2 | 0 |
| Eighth surface | | | | | | |
| i 10 | | | | | 3.23E−10 | 6.63E−10 |
| 8 | | | | −5.53E−10 | −1.29E−08 | −1.06E−08 |
| 6 | | | | 6.30E−08 | −1.67E−07 | −1.85E−06 |
| 4 | | | | −1.87E−06 | 2.40E−06 | −1.31E−04 |
| 2 | | | | 4.37E−06 | 3.18E−06 | −2.92E−02 |
| 0 | 6.63E−10 | −1.06E−08 | −1.85E−06 | −1.31E−04 | −2.92E−02 | 1.52E−08 |
| Ninth surface | | | | | | |
| i 10 | | | | | 1.37E−10 | 1.60E−10 |
| 8 | | | | −5.09E−10 | −1.16E−08 | −1.10E−08 |
| 6 | | | | 5.63E−08 | 1.84E−07 | −1.24E−06 |
| 4 | | | | −1.98E−06 | −4.03E−06 | −1.08E−04 |
| 2 | | | | 9.33E−06 | 7.65E−05 | −3.12E−02 |
| 0 | 1.60E−10 | −1.10E−08 | −1.24E−06 | −1.08E−04 | −3.12E−02 | 1.40E−06 |

The non-arc amount defined up to the fourth order of both the surfaces R8 and R9 of the anamorphic lens of the image reading lens LG according to Embodiment 2 is values of coefficients C24, C44, C64, and C84. Therefore, the non-arc amount defined up to the fourth order in the sub scanning section at the position in the main scanning direction continuously changes depending on the main scanning position. When a main scanning change in non-arc amount is provided for both surfaces, a sagittal flare is more excellently corrected.

This embodiment is not limited to the point that the anamorphic surface is provided on each of both surfaces and not limited to the fourth-order change of the sagittal line. In this embodiment, the main scanning section and the sub scanning section in a range of an on-axis light beam diameter of φ3.2 mm relative to the optical axis have the same shape as corrected. The non-arc amount of the sub scanning section also continuously changes as the distance from the optical axis in the main scanning direction increases, and hence the sagittal flare is excellently corrected at the arbitrary position in the main scanning direction. Therefore, as illustrated in FIG. 7, the image reading lens having a substantially uniform and high contrast in the entire original reading width range is realized. As illustrated in FIG. 6, the image field curvature for the e-line is much excellently corrected.

In this embodiment, the values related to Conditional Expression (2) above are as follows.

S=φ3.2 mm d=2.3 mm

S/d=1.39

Therefore, in this embodiment, the image field curvature and the sagittal flare are excellently corrected at the arbitrary position in the main scanning direction.

Flatbed Type Image Reading Apparatus

Figure 9:
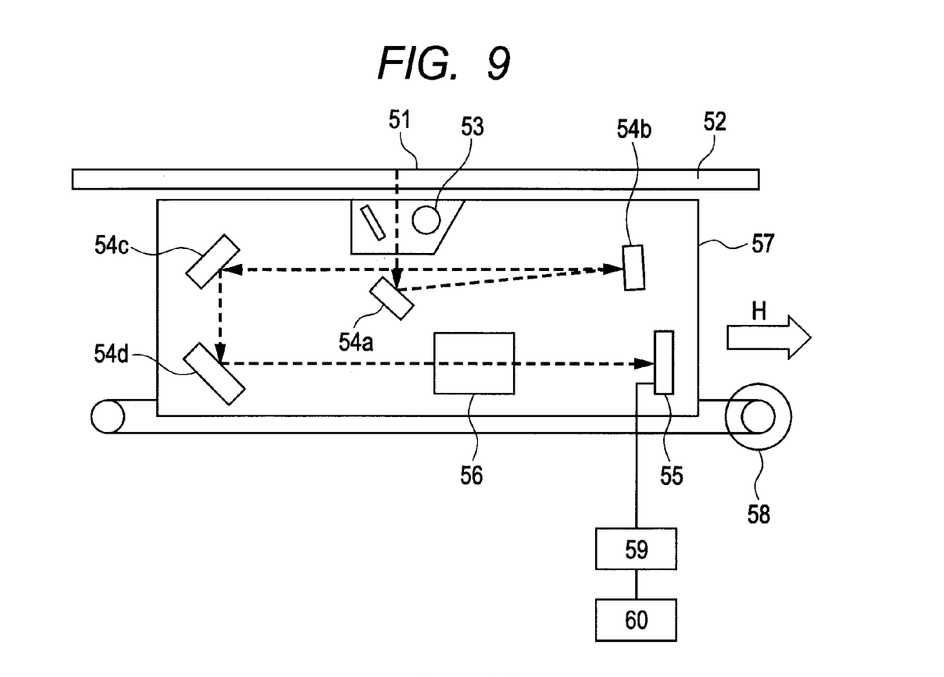
FIG. 9 is a main part schematic diagram illustrating the image reading apparatus according to the present invention.

FIG. 9 is a main part schematic diagram illustrating a carriage-integrated (flatbed type) image reading apparatus, for example, a digital copying machine including the image reading lens according to any one of Numerical Embodiments 1 and 2 of the present invention. In FIG. 9, an original 51 placed on an original table 52 is illuminated directly or through a reflection shade with a light beam emitted from an illumination system 53. An optical path of a reflected light beam from the illuminated original 51 is bent in an inner portion of a carriage 57 through first, second, third, and fourth reflection mirrors 54a, 54b, 54c, and 54d. The bent light beam is imaged by an image reading lens 56 according to any one of Numerical Embodiments 1 and 2 on a surface of a line sensor (linear image sensor) 55 serving as a reading unit.

The carriage 57 is moved by a sub scanning mechanism 58 in a direction indicated by the arrow H (sub scanning direction) to two-dimensionally read image information of the original 51. The read image information is sent to an external device 60, for example, a personal computer through an interface 59.

The image reading apparatus according to the present invention includes the image reading lens 56 according to any one of Numerical Embodiments 1 and 2 to read high-quality image information while reducing the size of the entire system. The image reading lens according to the present invention may be applied to not only the integrated (flatbed type) image reading apparatus but also, for example, an image reading apparatus including a 1:2 scanning optical system as illustrated in FIG. 10.

Figure 10:
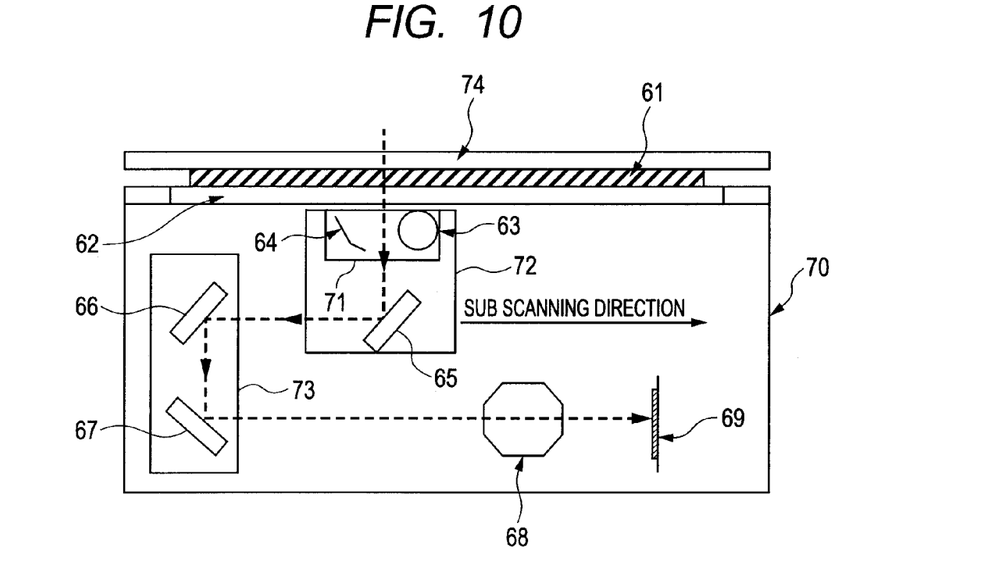
FIG. 10 is a main part schematic diagram illustrating the image reading apparatus according to the present invention.

In FIG. 10, an original 61 is placed on a surface of an original table (original table glass) 62. An illumination light source 63 includes, for example, a halogen lamp, a fluorescent lamp, a xenon lamp, or an LED array. A reflection shade 64 is provided to reflect a light beam from the illumination light source 63, to thereby efficiently illuminate the original 61. First, second, and third reflection mirrors 65, 66, and 67 are provided to bend an optical path of the light beam from the original 61 in an inner portion of a carriage 70. An image reading lens 68 according to any one of Numerical Embodiments 1 and 2 is provided to image a light beam of image information of the original 61 on a surface of a line sensor (CCD sensor or CMOS sensor) 69. The carriage (main body) 70, a platen 74, a first mirror table 72, and a second mirror table 73 are provided.

In FIG. 10, the original 61 is illuminated directly or through the reflection shade 64 with the light beam emitted from the illumination light source 63. The optical path of the reflected light beam from the illuminated original 61 is bent in the inner portion of the carriage (main body) 70 through the first, second, and third reflection lenses 65, 66, and 67. The bent light beam is imaged by the image reading lens 68 on the surface of the line sensor 69. In this case, the first, second, and third reflection mirrors 65, 66, and 67 are moved in the sub scanning direction so that electrical scanning is performed in the main scanning direction (direction perpendicular to sheet surface) to read the image information of the original 61.

In this case, the second and third reflection mirrors 66 and 67 are moved by half the movement amount of the first reflection mirror 65 to maintain a constant distance between the original 61 and the line sensor 69.

In this embodiment, the image reading lens according to the present invention is applied to the image reading apparatus which is the digital color copying machine. However, the present invention is not limited to this and may be applied to various color image reading apparatus including a color image sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-113171, filed May 17, 2010, which is hereby incorporated by reference herein in its entirety.

What is claimed is:

1. An imaging optical system which is used for an image reading apparatus for reading image information of an original by respectively moving the original and a reading unit including multiple reading pixels arranged in a first direction, in a second direction orthogonal to the first direction, and images the original on the reading unit, the imaging optical system comprising an anamorphic lens having an anamorphic surface with an aspherical shape which is rotationally asymmetric about an optical axis, wherein:

the anamorphic surface has a non-arc shape in each of a first section orthogonal to the second direction and a second section orthogonal to the first direction; and the anamorphic lens has a positive optical power in the first section on the optical axis, and a non-arc amount in a second section of the anamorphic surface continuously varies with increasing distance from the optical axis along the first direction, so that a Modulation Transfer Function curve does not have a local minimum value over an entire region in the first direction.

2. An imaging optical system according to claim 1, wherein, in the anamorphic surface, the first section and the second section have the same shape in an on-axis light beam diameter range relative to the optical axis.

3. An imaging optical system according to claim 1, wherein the following condition is satisfied:

$$0.5 \leq S/d \leq 3.0$$

where d (mm) indicates a thickness of the anamorphic lens and S (mm) indicates an on-axis effective length of a light incident surface of the anamorphic lens in the second direction.

4. An imaging optical system according to claim 1, wherein the anamorphic lens includes a light incident surface and a light exiting surface each having the anamorphic surface.

5. An imaging optical system according to claim 1, wherein the anamorphic lens is molded by resin.

6. An imaging optical system according to claim 1, wherein the imaging optical system comprises, in order from a side of the original:

a first lens of a positive lens having a meniscus shape with a convex surface facing the side of the original;

a second lens of a negative biconcave lens;

a third lens of a positive biconvex lens; and a fourth lens which has a meniscus shape with a convex surface facing toward the reading unit and includes an anamorphic surface.

7. An imaging optical system according to claim 1, where in a case of defining that $S4_n$ indicates a fourth-order coefficient related to a sagittal line of the anamorphic surface at an arbitrary position in the first direction, and $S4_0$ indicates a fourth-order coefficient related to an on-axis sagittal line of the anamorphic surface, the value of $S4_n/S4_0$ continuously varies with increasing distance from the optical axis along the first direction, so that a Modulation Transfer Function curve does not have a local minimum value over an entire region in the first direction.

8. An image reading apparatus, comprising:
an imaging optical system; and
a reading unit including multiple reading pixels arranged in a first direction,
the image reading apparatus reads image information of an original by respectively moving the original and the reading unit in a second direction orthogonal to the first direction, and images the original on the reading unit, wherein:
the imaging optical system comprises an anamorphic lens having an anamorphic surface with an aspherical shape which is rotationally asymmetric about an optical axis,
the anamorphic surface has a non-arc shape in each of a first section orthogonal to the second direction and a second section orthogonal to the first direction,
the anamorphic lens has a positive optical power in the first section on the optical axis, and
a non-arc amount in a second section of the anamorphic surface continuously varies with increasing distance from the optical axis along the first direction, so that a Modulation Transfer Function curve does not have a local minimum value over an entire region in the first direction.

* * * * *